United States Patent [19]

Funk et al.

[11] 3,781,453
[45] Dec. 25, 1973

[54] ELECTRICAL PENETRATION ASSEMBLY

[75] Inventors: Forrest E. Funk, San Jose; Richard T. Oda, Sunnyvale; Norman G. Luria; Edward G. Margherone, both of San Jose, all of Calif.

[73] Assignee: General Electric Company, San Jose, Calif.

[22] Filed: Apr. 12, 1972

[21] Appl. No.: 243,310

[52] U.S. Cl. .......................... 174/11 R, 174/151
[51] Int. Cl. .................................. G21c 13/02
[58] Field of Search............ 174/11 R, 11 BH, 174/18, 22 R, 23 R, 70 S, 73 R, 151, 152 R

[56] References Cited
UNITED STATES PATENTS
3,520,989  7/1970  Funk et al. ..................... 174/151
3,601,526  8/1971  Bohne et al. ................... 174/151

FOREIGN PATENTS OR APPLICATIONS
1,211,236  10/1959  France ........................... 174/18
1,181,335  11/1964  Germany ....................... 174/151

Primary Examiner—Laramie E. Askin
Attorney—Ivor J. James et al.

[57] ABSTRACT

An assembly of double-sealed modules for passing electrical conductors through the wall of a vapor and pressure sealed containment vessel.

24 Claims, 9 Drawing Figures

ELECTRICAL PENETRATION ASSEMBLY

BACKGROUND

Presssure containments having provision for passing electrical conductors through the walls of the containment vessel are used for various purposes. For example, in a known type of nuclear power station the reactor core is contained in a reactor pressure vessel constructed of steel. The reactor pressure vessel, in turn, is housed in a containment building or vessel usually formed of concrete lined with steel and having walls of several feet in thickness. The containment vessel thus provides biological shielding and it is pressure sealed to prevent the escape of vapors and liquids. For operation of the reactor it is necessary to pass a variety of electrical conductors through the wall of the containment vessel. To accommodate these electrical conductors, penetration nozzles or tubes are placed through the walls of the containment vessel during its construction.

To maintain the pressure and vapor sealing integrity of the containment vessel, the electrical conductors are sealed in penetration devices which are, in turn, sealed within the penetration nozzles.

A variety of electrical penetration devices have been proposed and used, for example, as shown in U.S. Pats. Nos. 3,520,989 and 3,601,526.

Continued improvement of electrical penetration devices is desirable to reduce cost, increase reliability and to simplify construction and on-site installation.

Thus an object of the invention is to provide an improved electrical penetration formed of separately sealed modules of relatively small size.

SUMMARY

The electrical penetration of the invention comprises an apertured header, which may be sealed to one end of the penetration nozzle, and a separate module supported in each of the apertures solely by the one header, each module comprising an elongated hollow body with one or more electrical conductors extending therethrough with vapor and pressure seals between the conductor and each end of the module body to form a double barrier with a chamber therebetween which can be pressurized to test the integrity of the seals.

DRAWING

The invention is described in greater detail hereinafter with reference to the accompanying drawing wherein.

DESCRIPTION

Figure 1:
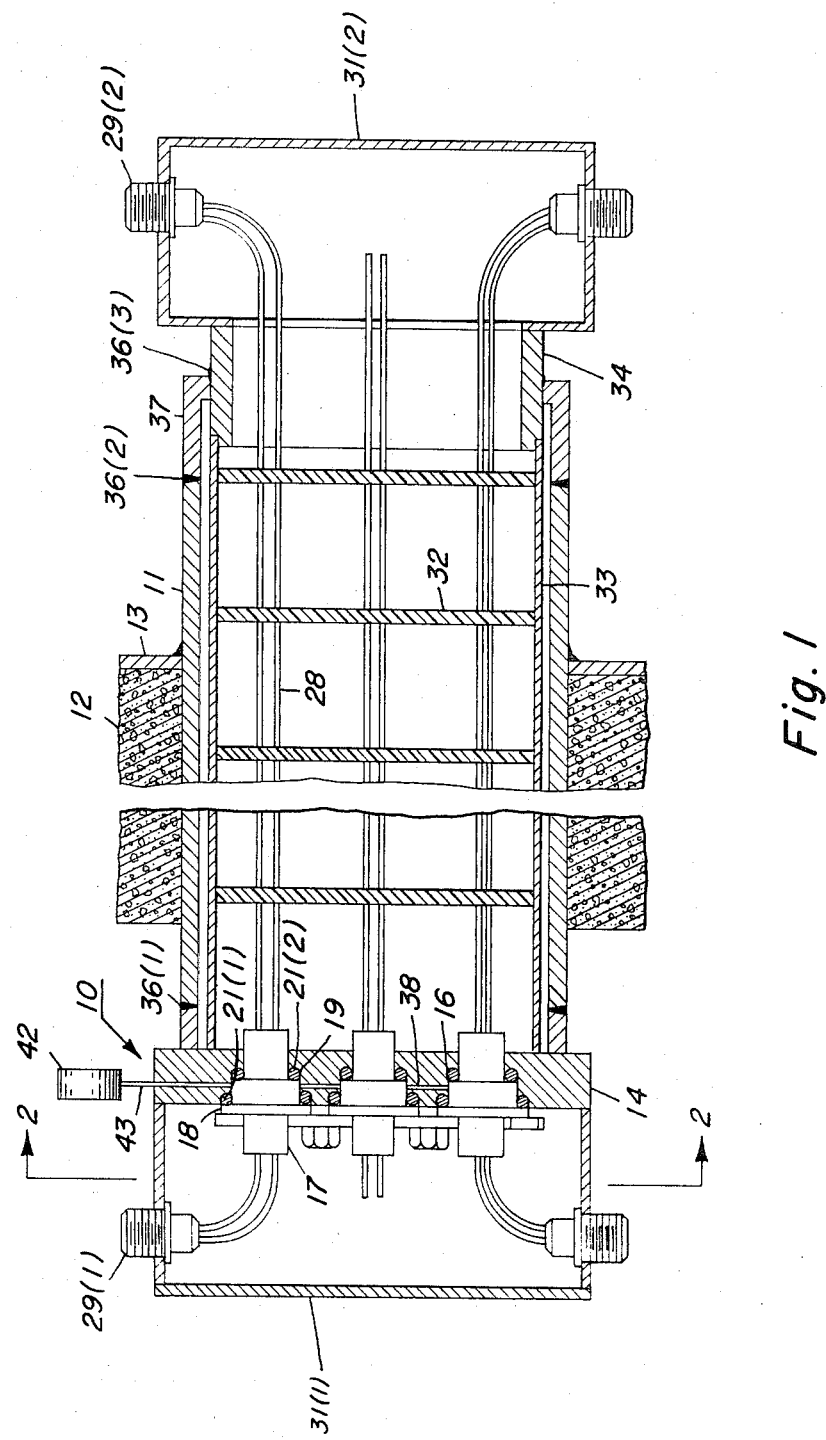
FIG. 1 is a longitudinal cross sectional view of the general form of the electrical penetration of the invention as installed in a penetration nozzle in the wall of a containment vessel.

Shown in FIG. 1 is a penetration assembly 10 as installed in a penetration nozzle 11 positioned through a concrete wall 12 of a containment vessel. A typical penetration nozzle 11 is formed of steel pipe of from eight to eighteen inches in diameter and from 3 to 12 feet long depending upon the thickness of the containment wall. Normally a member 13 on the inside of the containment wall 12 is welded to the nozzle 11, the member 13 being a steel liner of the containment vessel or a suitable flange.

Figure 2:
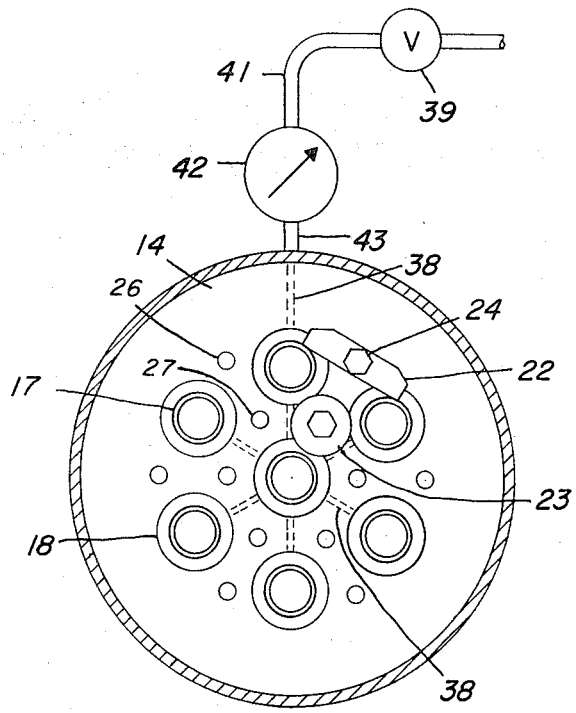
FIG. 2 is a left end view of the electric penetration taken at section 2—2 of FIG. 1.

The penetration assembly 10 comprises a header 14 formed with a plurality of spaced apertures 16 each adapted to receive, with clearance, a feed-through module 17. (While seven modules 17 are shown in FIGS. 1 and 2, the number of modules that can be accommodated in a given penetration assembly depends upon the diameter of the header 14, which is in turn dependent on the diameter of nozzle 11, and upon the magnitude of the voltage applied to and current carried by the conductors.) Each module 17 of the replaceable type is formed with a flange 18 and a shoulder 19 which bear against a pair of O rings 21(1) and 21(2) by which the module 17 is sealed to the header 14. The O rings are maintained under compression by a clamp arrangement comprising clamp bars 22, and clamp rings 23 (see FIG. 2) which are removably secured to the header 14 with cap screws 24. (For clarity of drawing only one clamp bar 22 and one clamp ring 23 are illustrated in FIG. 2 it being understood that additional clamp bars 22 are installed over threaded holes 26 and that additional clamp rings are installed over threaded holes 27.)

Each module 17 is adapted to pass one or more electrical conductors 28. As explained more fully hereinafter, the conductors 28 are sealed in each end of the modules 17 to provide a double vapor and pressure barrier and to provide an intermediate chamber which can be pressurized to test the integrity of the seals. To the left, the conductors 28 terminate in connectors 29(1) (or other suitable means, such as terminal strips) supported in a junction box 31(1). To the right, the conductors extend through the nozzle 11 wherein intermediate support is provided by a plurality of spaced support plates 32. The plates 32 are supported by a perforated or skeletonized cover 33 attached at its right hand end to the header 14 and at its left hand end to an end sleeve 34.

The penetration assembly 10 is secured to the nozzle 11 by a weld 36(1) between the header 14 and the left hand end of the nozzle and at the right hand end by a weld or support ring 37 welded between the nozzle 11 and the end sleeve 34 by welds 36(2) and 36(3). At the right, the conductors 28 may terminate in suitable connectors 29(2) supported in a junction box 31(2).

As mentioned hereinbefore, an arrangement is provided for pressure testing the integrity of the seals. This arrangement includes a plurality of passages 38 in the header 14 interconnecting the apertures 16 between the O rings 21(1) and 21(2). The gas pressure in passages 38 may be monitored by a pressure meter 42 connected to the passages 38 by a tube 43. A pressurized gas may be applied to the passages 38 through a valve 39 and a tube 41.

Figure 3:
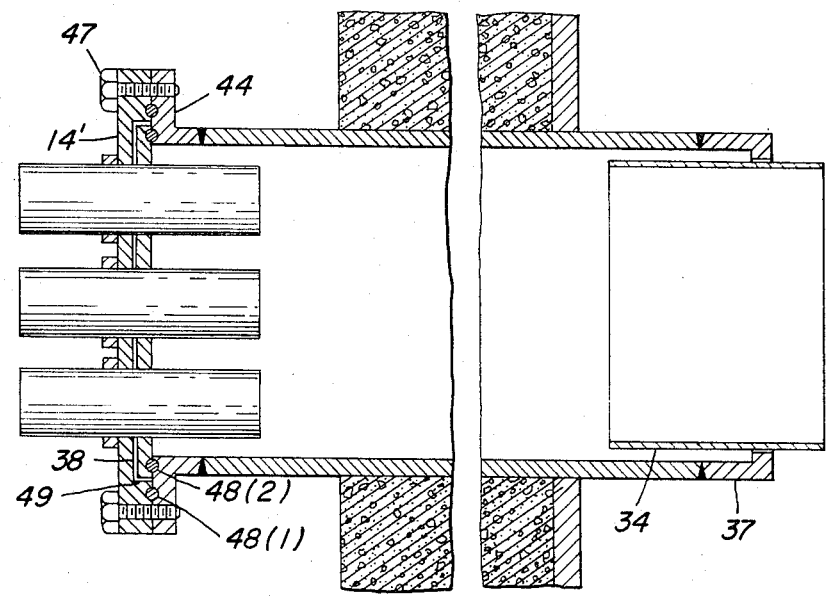
FIG. 3 is a longitudinal cross sectional view illustrating an alternative arrangement of attachment of the header to the penetration nozzle.

In some applications it may be desirable to avoid welding the penetration assembly 10 to the nozzle 11 so that the assembly readily may be removed. This objective is served by the arrangement illustrated in FIG. 3 wherein a flange 44 is welded to the left hand end of the nozzle 11. The flange 44 and the header 14' are clamped together by cap screws 47 and are sealed by a pair of spaced O rings 48(1) and 48(2). A passage 49 connects the space between O rings 48(1) and 48(2) to the passages 38 so that the integrity of the seal by these O rings may be tested by the pressurized gas arrangement described in connection with FIGS. 1 and 2. At the right hand end, the end sleeve 34 is a clearance fit in the support ring 37 (the weld 36(3) of the arrangement of FIG. 1 being omitted).

The general arrangement of the penetration assembly 10 has been described above in connection with FIGS. 1–3. Several embodiments of the module 17 to accommodate various types of electrical conductors will now be described with reference to FIGS. 4–9.

Figure 4:
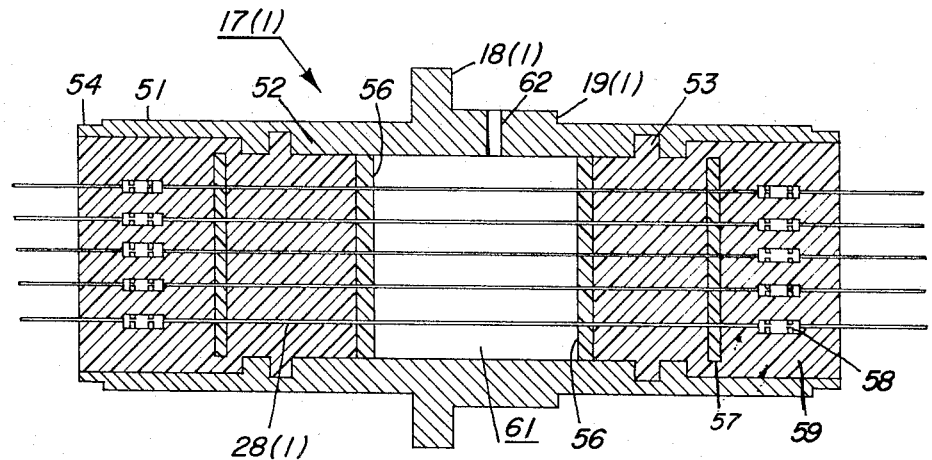
FIG. 4 is a longitudinal cross sectional view of a module for accommodating signal and control conductors.

Shown in FIG. 4 is a module 17(1) for accommodating low-voltage signal and control conductors. The module 17(1) is formed of an elongated tubular housing 51 having formed on its outside a flange 18(1) and a shoulder 19(1) sized to fit the apertures 16 and engage the O rings 21(1) and 21(2) as shown in FIG. 1. On its inside the housing 51 is formed with a central portion 52, irregularities, such as grooves 53, and outer portions 54. Extending through the housing 51 are a plurality of electrical conductors 28(1) supported by apertured disks 56 and 57, the disks 56 and 57 being formed of insulating material. Within each other portion 54 of the hoursing 51 a splice is formed in the conductors 28(1), for example, by the use of crimp type connectors 58.

The disks 56 are a tight fit in the central portion 52 of the housing 51 and the apertures in the disks 56 are a tight fit for the conductors 28(1) so that the disks 56 form a dam against a casting resin 59, such as an epoxy resin, which fills each end of the housing 51, the apertures in disks 57 being slightly oversize so that the resin can flow therethrough into the space between disks 56 and 57. The resin also fills the grooves 53 (or other forms of irregularities) to thus provide a mechanical lock of the resin in the housing. The purpose of the connectors 58 is to provide an encapsulating joint to seal against leakage through the conductors 28(1). This is particularly necessary when the conductors 28(1) are formed of stranded wire.

With both ends of the housing 51 sealed by the resin 59, a chamber 61 is provided between the disks 56. For testing the integrity of the sealing of the module 17(1), the chamber 61 is connected to the passages 38 in header 14 (FIG. 1) via a hole 62.

Figure 5:
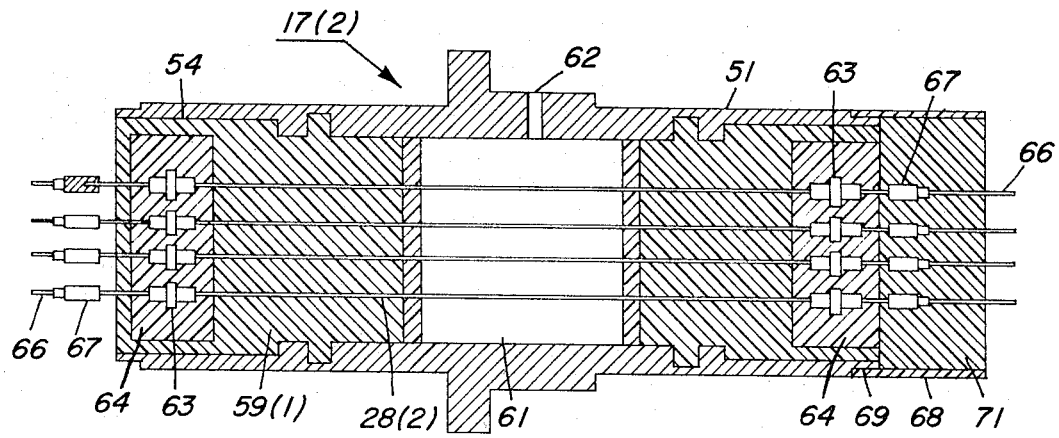
FIG. 5 is a longitudinal cross sectional view of a module using pin connectors.

For some applications it is advantageous to provide pin connections at each end of the module. Such an arrangement is shown in FIG. 5 wherein conductors 28(2) through the module 17(2) are soldered, crimped or otherwise connected to male pin connectors 63, the pin connectors 63 being held in alignment by disks 64 which are formed with appropriate holes to accommodate the pins. These holes are made slightly oversize so that casting resin 59(1) may fill the interstices thus bonding the pins 63 in the disks 64 and bonding the disks 64 to the housing 51 of the module.

The advantage of this arrangement is that modules of standard sizes and numbers of conductors may be manufactured and conveniently stocked. When the module is to be used, extension conductors 66 of appropriate length for the particular application are fitted with female pin connectors 67 and attached to the male pins 63. If desirable, a sleeve 68 can be fitted over a reduced diameter end portion 69 of the housing 51 and filled with a casting resin 71 to seal the pin connectors 67 in place.

Figure 6:
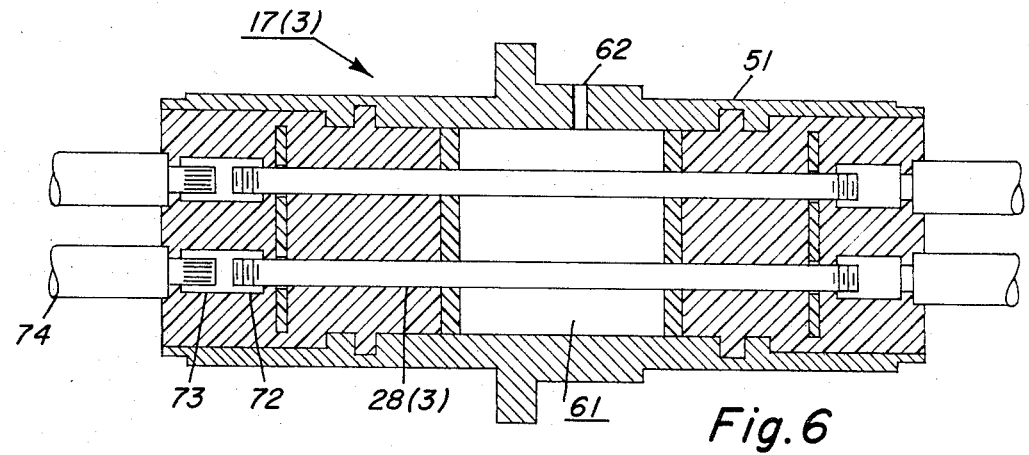
FIG. 6 is a longitudinal cross sectional view of a module for accommodating low voltage power conductors.

Shown in FIG. 6 is a module 17(3) for accommodating low-voltage, high-current conductors (for example, size No. 8 AWG and larger). The conductors 28(3) through the module are in the form of rods having threaded ends fitted with connectors 72. The outer ends of connectors 72 are formed with cavities 73 to receive the stripped ends of connector 72 are formed with cavities 73 to receive the stripped ends of extension cables 74. These stripped ends may be crimped, soldered or otherwise conductively fixed in the cavities 73.

Figure 7:
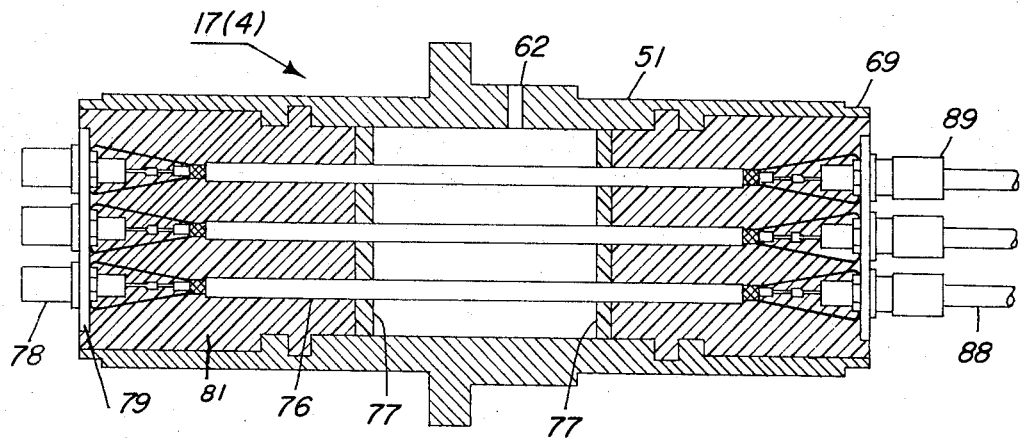
FIG. 7 illustrates a module for accommodating shielded signal conductors.

Illustrated in FIG. 7 is a module 17(4) for accommodating shielded signal cables 76. The cables 76 may be coaxial, triaxial or other shielded cables. The cables 76 are threaded through spaced support disks 77 and are terminated at each end of the module 17(4) in hermetically sealed connectors 78 mounted on insulating disks 79. The conductor concentricity configurations are carried throughout. A casting resin 81 fills the space between disks 77 and 79 to provide the desired double seal.

Extension cables 88 are fitted with connectors 89 mating with the connectors 78. If desired a sleeve may be fitted over the end portion 69 of the housing 51 and filled with a casting resin to seal the connectors 89 in the manner shown in FIG. 5.

Figure 8:
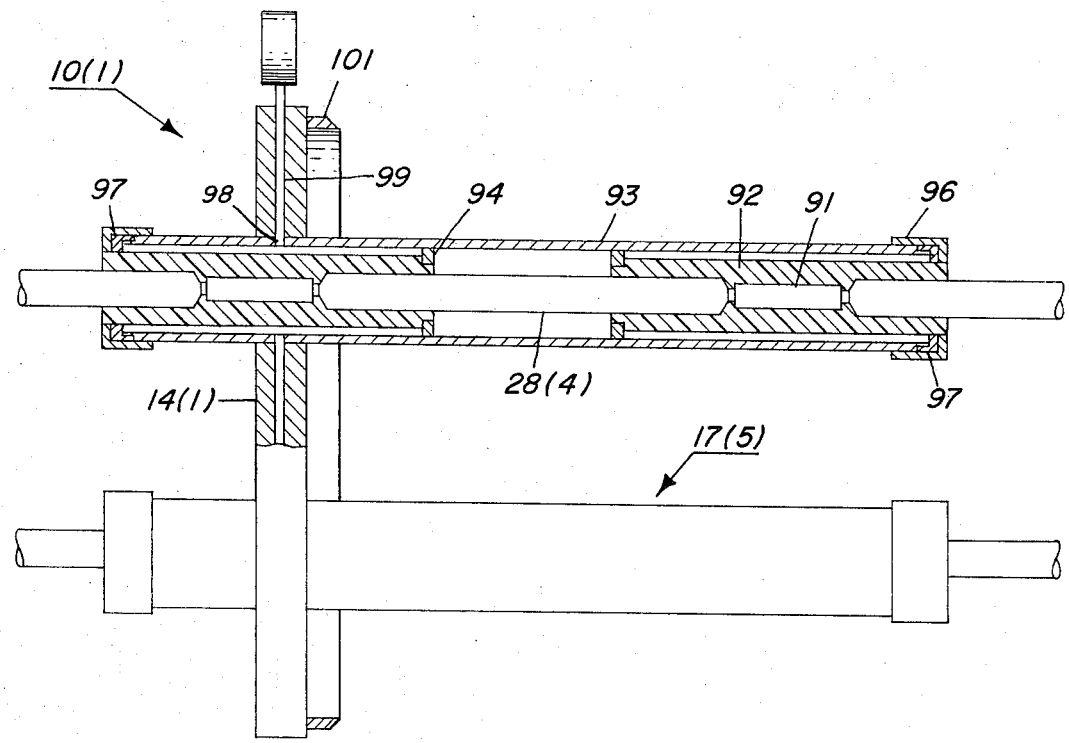
FIG. 8 is a longitudinal cross sectional view of a module for accomodating medium voltage power conductors.
Figure 9:
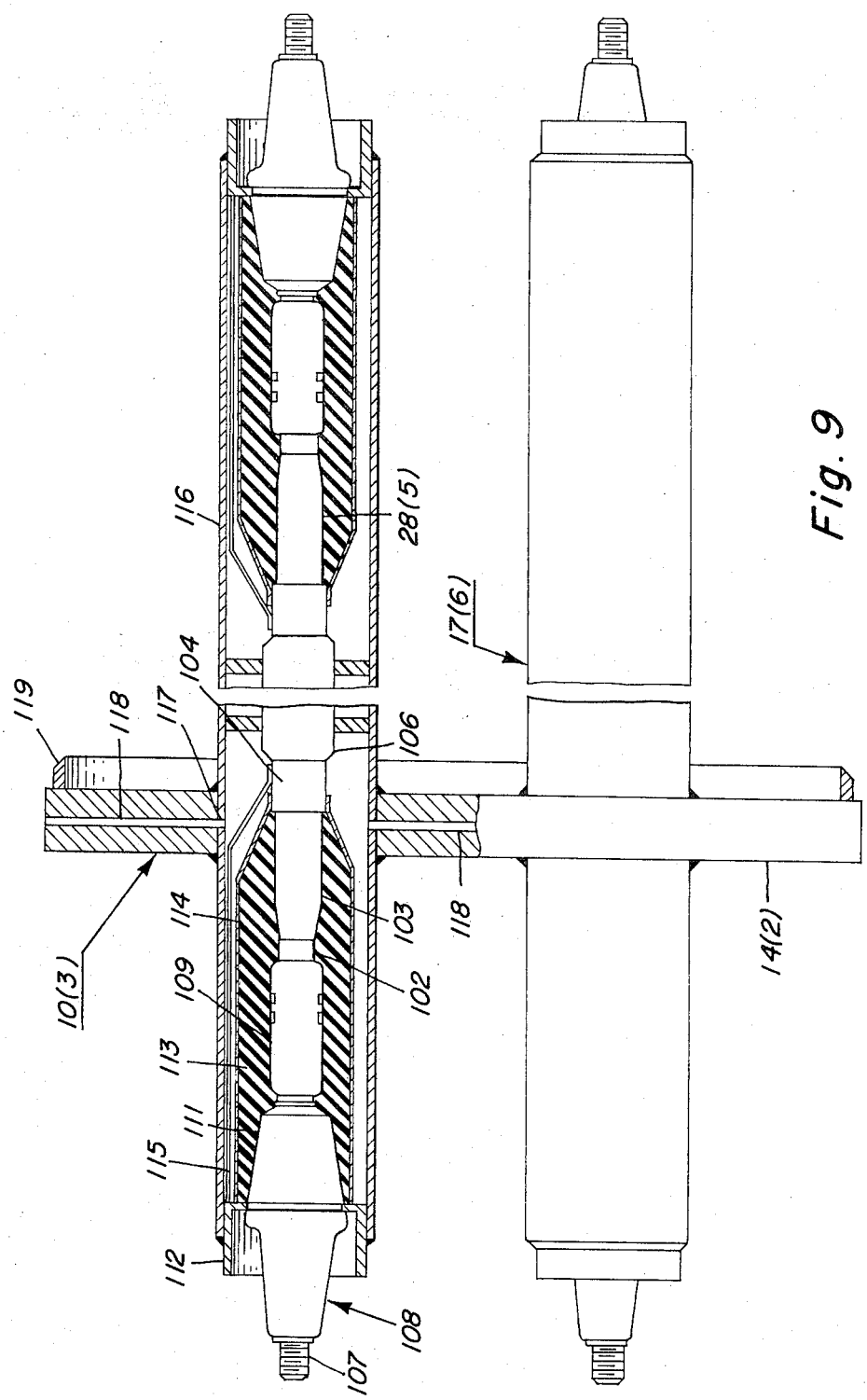
FIG. 9 is a longitudinal cross sectional view of a module for accommodating high voltage power conductors.

Shown in FIG. 8 is a penetration assembly 10(1) comprising a plurality of modules 17(5) for accommodating a medium voltage (for example, 5,000 volts) conductor 28(4). Such conductors are formed with stranded wire and covered with an insulating jacket. The conductor 28(4) is cut, stripped and spliced with crimp connectors 91. The splices are then encapsulated in a casting resin 92 by which the spaces among the wire strands and between the wire and the insulating jacket are sealed.

The spliced, encapsulated conductor 28(4) is placed within an elongated housing 93 which is welded within an aperture in a header 14(1). The inner ends of the encapsulated portions of the conductor 28(4) are centered by spacer rings 94. Apertured cups 96 are placed over the ends of the housing 93 and filled with casting resin 97.

An aperture 98 in the wall of the housing 93 communicates with a passage 99 by which the interior of the module 17(5) can be pressurized to test the integrity of the seals in the manner described in connection with FIG. 1. The header 14(1) is formed with a weld ring 101 by which the header 14(1) is welded to the end of a penetration nozzle, such as the nozzle 11 of FIG. 1.

Although only two medium-voltage modules 17(5) are shown in FIG. 8, a header 14(1) of a size to fit a nozzle of twelve inches in diameter may accommodate as many as six such medium-voltage modules. In such case, the passage 99 connects the apertures 98 of all the modules (similar to the arrangement of FIGS. 1 and 2) so that all such modules may be pressure tested simultaneously.

Shown in FIG. 8 is a penetration assembly 10(3) comprising a plurality of modules 17(6) each accommodating a high-voltage (for example, 15,000 volts) conductor or cable 28(5). Cables which carry more than 5,000 volts through a penetration are required to be shielded to assure even voltage stressing of the insulation. Thus the cable 28(5) comprises a central conductor 102 of stranded wire, an insulating layer 103, a conductive shield 104 and a protective covering 106. The cable 28(5) is jointed to threaded feed-through rods 107 of a pair of bushings 108 by means of connectors 109 crimped to the stripped ends of the cable. The bushings 108 include an insulator 111 to which is affixed a mounting ring 112. The joints between the cable 28(5) and the bushings 108 are encapsulated in a resilient insulating material such as a synthetic rubber 113. These encapsulated portions are covered with a resilient conductive coating 114 (for example, by a settable liquid coating or by a wrapping of conductive rubber tape) to form a conductive bridge between the mounting rings 112 and the cable shield 104 to thereby provide continuity of the cable shielding. A wire 115 between the ring 112 and shield 104 assures a low-resistance electrical connection.

The assembly thus formed is contained in a tubular housing 116 to which the mounting rings 112 of bushings 108 are welded. The housing 116 is welded to a header 14(2), the housing 116 being formed with an aperture 117 and the header 14(2) containing passages 118 for testing the integrity of the seals as described hereinbefore. The header 14(2) is formed with a weld ring 119 for welding to the end of a penetration nozzle, such as the nozzle 11 of FIG. 1.

Extension cable (not shown) can be connected to the threaded outer ends of the feed-through rods 107. Such external joints can be encapsulated and sealed in a manner similar to the sealing of the internal joints described above, the mounting rings 112 being positioned to extend somewhat beyond the ends of housing 116 to provide a convenient surface for making connection to the extension cable shields.

What is claimed is:

1. An electrical penetration assembly for a containment vessel comprising: an elongated hollow penetration nozzle sealed in a wall of said vessel to provide a passage therethrough; an apertured header sealed to one end of said nozzle; at least one module sealed in an aperture in said header, said module comprising an elongated hollow body, said body having a length less than the length of said nozzle, said module being supported solely by said header; at least one electrical conductor extending through said body; means providing a vapor and pressure seal between said conductor and each end of said body and providing a chamber within said body intermediate of said ends; and means communicating with said chamber for pressurizing said chamber to test the integrity of said seals.

2. The penetration assembly of claim 1 including a connection in said conductor adjacent each end of said body of said module; and insulating material encapsulating said connections.

3. The pentration assembly of claim 2 wherein said connections are crimp type connectors.

4. The penetration assembly of chaim 2 wherein said conductor is formed of a rod threaded at each end and wherein said connections are formed by connectors threaded onto said ends to connect said rod to a pair of extension conductors.

5. The penetration assembly of claim 2 wherein said conductor is shielded and wherein said connections are shielded cable connectors.

6. The penetration assembly of claim 2 wherein said connections are formed of pin type connectors.

7. The penetration assembly of claim 1 wherein said means providing a vapor and pressure seal comprises a casting resin filling the spaces of at least a section of said body between said chamber and each end of said body.

8. The penetration assembly of claim 7 wherein each of said sections contains internal irregularities filled by said resin to lock said resin within said body.

9. The penetration assembly of claim 1 including a pair of disks of insulating material positioned in spaced relation in said body intermediate the ends thereof to define said chamber, said disks being formed with perforations to pass and support said conductor, said conductor being a tight fit in said perforations and said disks being a tight fit in said body to form dams for a casting resin, and casting resin filling the spaces between said disks and at least a portion of the ends of said body to form said means providing a vapor and pressure seal.

10. The penetration assembly of claim 1 including first and second spaced O rings between said module and said header; and means compressing said O rings against said receiving surfaces to seal said module to said header.

11. The penetration assembly of claim 10 including a first passage in said header communicating with a clearance space between said module and said header between said first and second O rings.

12. The penetration assembly of claim 11 including an aperture in said body intermediate said first and second O rings communicating said chamber with said clearance space; and said means for pressurizing also pressurizes said passage.

13. The penetration assembly of claim 12 including indicating means attached to said pressurizing means pressure.

14. The penetration assembly of claim 12 including a nozzle flange at said one end of said penetration nozzle; a flange mating surface formed on said header; a pair of spaced O rings between said nozzle flange and said flange mating surface; means compressing said pair of O rings between said nozzle flange and said flange mating surface; and a second passage in said header communicating a space between said nozzle flange and said flange mating surface between said pair of O rings with said first passage in said header.

15. The penetration assembly of claim 12 including a plurality of said modules scaled in said header wherein said first passage communicates with said clearance space of each of said modules.

16. The penetration assembly of claim 1 including a cover secured to said header and extending into said nozzle; means within said cover providing intermediate support for said conductor; a support ring fixed to the other end of said nozzle; and an end sleeve fixed to said cover and extending through an aperture in said support ring.

17. The penetration assembly of claim 16 wherein said support ring is fixed to said end sleeve.

18. The penetration assembly of claim 16 including a first junction box supported by said header and a second junction box supported by said end sleeve.

19. The penetration assembly of claim 1 including a cup over each end of said module body, said cup being apertured and passing said conductor, and a sealing material between each said cup and said conductor.

20. The penetration assembly of claim 1 including a pair of electrically insulating bushings sealed to the ends of said body of said module.

21. The penetration assembly of claim 20 wherein each of said bushings comprises an insulator, a feedthrough rod extending through and sealed to said insulator and a mounting ring surrounding and sealed to a central portion of said insulator, said mounting ring being formed with a cylindrical portion welded to an end of said body of said module.

22. The penetration assembly of claim 21 wherein a part of said cylindrical portion extends beyond said end of said body.

23. The penetration assembly of claim 21 wherein said conductor is formed of a cable having a central conductor, a layer of insulation and a conductive shield; a pair of connectors connecting stripped ends of said central conductor to the inside ends of the feedthrough rods of said bushings; an insulating material covering said connectors and the adjacent ends of said bushings and said conductors; and a conductive material formed over said insulating material and making electrical connection between said conductive shield and said mounting rings of said bushings.

24. The penetration assembly of claim 23 including wires conneced between said mounting rings and said conductive shield.

* * * * *

UNITED STATES PATENT OFFICE
CERTIFICATE OF CORRECTION

Patent No. 3,781,453         Dated    25 Dec. 1973

Inventor(s) F. E. Funk/R. T. Oda/N. G. Luria/E. G. Margherone

It is certified that error appears in the above-identified patent and that said Letters Patent are hereby corrected as shown below:

Column 1, line 55, "electric" should be --electrical--;
Column 3, line 7, "ilustrated" should be --illustrated--;
Column 3, line 36, "other" should be --outer--;  Column 3, line 37, "hoursing" should be --housing--;

Column 4, line 65, "nozle" should be --nozzle--;  Column 5, line 4, "Fig. 8" should be --Fig. 9--;  Column 5, line 38, "cable" should be --cables--;  Column 6, line 45, before the word indicating insert --pressure--;  Column 6, line 46, delete "pressure" and insert a period after means;  Column 6, line 58, "scaled" should be --sealed--;  Column 7, line 7, second occurrence of "cup" should be --cups--;  Column 8, line 17, "conneced" should be --connected--.

Signed and sealed this 29th day of October 1974.

(SEAL)
Attest:

McCOY M. GIBSON JR.
Attesting Officer

C. MARSHALL DANN
Commissioner of Patents